Feb. 16, 1926. 1,573,204
I. B. TANNER
LIQUID TREATING APPARATUS
Filed August 4, 1924
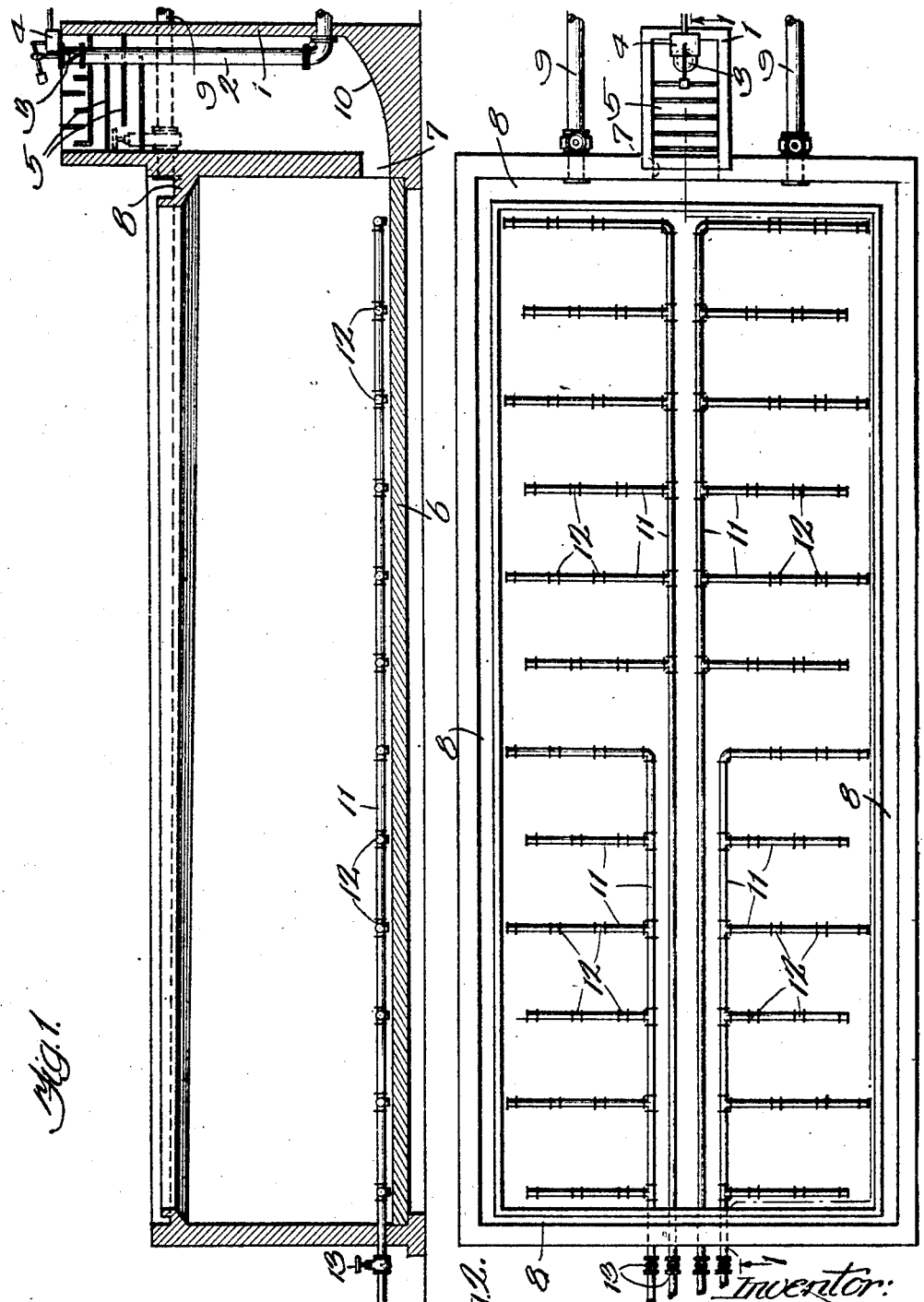

Patented Feb. 16, 1926.

1,573,204

UNITED STATES PATENT OFFICE.

INOS B. TANNER, OF CHICAGO, ILLINOIS, ASSIGNOR TO JOSEPH E. NELSON & SONS, OF CHICAGO, ILLINOIS, A FIRM COMPOSED OF JOHN E. NELSON AND WILLIAM H. NELSON.

LIQUID-TREATING APPARATUS.

Application filed August 4, 1924. Serial No. 730,053.

*To all whom it may concern:*

Be it known that I, INOS B. TANNER, a citizen of the United States, residing at Chicago, in the county of Cook and the State of Illinois, have invented a certain new and useful Improvement in Liquid-Treating Apparatus, of which the following is a full, clear, concise, and exact description.

My invention relates to liquid treating apparatus and resides in an improved interrelation of the treatment chamber and settling chamber of such apparatus and the provision of means for rendering uniform the completion of the chemical reaction occurring in the settling chamber. The settling chamber is provided with an outlet trough for the treated liquid which serves to cause an even distribution of the liquid in its passage from the place where it is received in the settling chamber to the place where this liquid is discharged, for the purpose stated.

The invention will be more fully explained in connection with the accompanying drawing in which Fig. 1 is a sectional elevation of the preferred embodiment of the invention taken on line 1—1 of Fig. 2; and Fig. 2 is a plan view of the equipment shown in Fig. 1.

The apparatus illustrated includes an upright treatment chamber 1 to which liquid, such as hard water, is conveyed for treatment through the pipe 2, the liquid passing from the pipe through the ports 3 in the upper end of the pipe. Chemical is admitted to the treatment chamber from the source of chemical 4, the rate at which the chemical is supplied being proportional to the rate at which the liquid is supplied, as is well understood by those skilled in the art. Baffle plates 5 are encountered by the descending liquid and chemical to thoroughly intermix the same. The reaction between the chemical and the liquid occurs mainly in the treatment chamber. It is concluded in the settling chamber 6, the two chambers being in communication through the passage 7 at the bottoms thereof. The settling chamber is preferably rectangular and horizontally elongated, the treatment chamber being located at one end of the settling chamber. An outlet trough 8 is located at the top of the settling chamber, this outlet trough desirably completely surrounding the body of liquid in the settling chamber. The trough forces an even distribution of the liquid flowing into the settling chamber on its way to the outlet pipe 9 that communicates with the trough.

The settling chamber being long with reference to the treatment chamber and the trough effecting an even distribution of the liquid flowing to it, there is resulting increase in the speed of the liquid treating process. The chambers being in communication at their bottom, there is no division of water and unused chemical through the outlet trough.

The sludge formed in the treatment chamber flows into the settling chamber along the sloping bottom 10 of the treatment chamber. This sludge, together with that which is precipitated in the settling chamber, may be withdrawn through the sludge pipes 11 suitably distributed along the bottom of the settling chamber and having suitable inlets 12 for the sludge. The sludge pipes are provided with cut-off valves 13 so that they may be normally closed during the liquid treating operation.

Changes may be made without departing from my invention.

Having thus described my invention, I claim:—

Liquid treating apparatus including a chamber; piping for conveying liquid to be treated to said chamber; a source of chemical discharging into said chamber; a horizontally elongated settling chamber, alongside of the treatment chamber, there being a passage establishing communication between the bottom portions of said chambers; and an outlet trough at an upper part of the settling chamber and surrounding the liquid body in this chamber.

In witness whereof, I hereunto subscribe my name.

INOS B. TANNER.